Sept. 2, 1958     F. S. HOLDERLE ET AL     2,850,346

ATTACHMENT FOR DISPLAY CASE

Filed March 11, 1957

INVENTORS.
FREDERICK S. HOLDERLE,
BY HARVEY C. R. HOLDERLE
AND NORBERT F. W. HOLDERLE
Harold E. Stonebraker

THEIR ATTORNEY

United States Patent Office 2,850,346
Patented Sept. 2, 1958

2,850,346
ATTACHMENT FOR DISPLAY CASE
Frederick S. Holderle, Harvey C. R. Holderle, and Norbert F. W. Holderle, Rochester, N. Y.
Application March 11, 1957, Serial No. 645,053
2 Claims. (Cl. 312—140.4)

This invention relates to an attachment for a display case, and has for its purpose to provide a simple, practical, and economical structure for detachably securing a weighing scale support or platform in convenient position for handling goods removed from the case.

Another object is to utilize the channel of one of the sliding doors of a display case to hold the scale support, and to provide the channel with interlocking means detachably engageable with the scale support which is slidable to engage the door channel, and includes means that interlocks with the channel to hold the scale support in position.

A further purpose is to afford a structure that can be economically manufactured, is easy to operate, and which successfully holds a weighing scale in convenient position for operation.

To these and other ends the invention consists in the construction and arrangement of parts that will appear clearly from the following description, when read in conjunction with the accompanying drawings, the novel features being pointed out in the claims following the specification.

Figure 1:
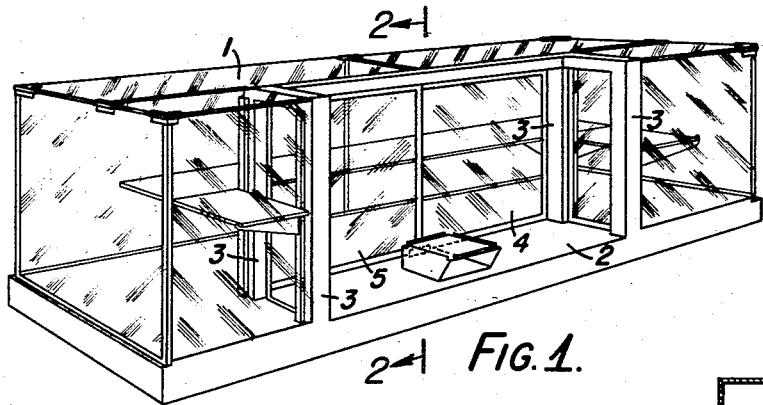
Fig. 1 is a perspective view showing a preferred form of the invention applied to a display case.
Figure 3:
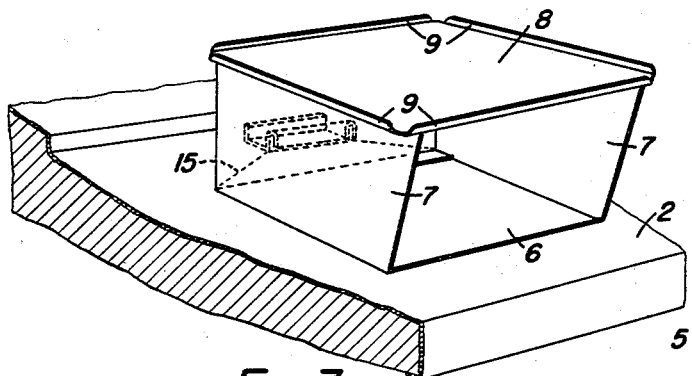
Fig. 3 is an enlarged perspective view of the scale support in operating position, with parts broken away.
Figure 4:
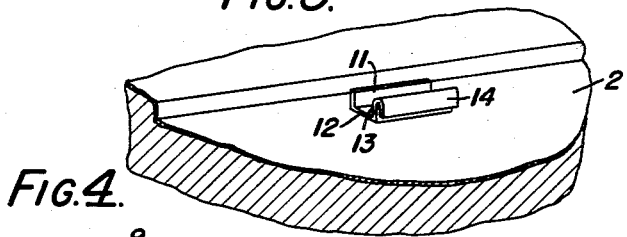
Fig. 4 is an enlarged perspective view of the counter portion of the display case, and door channel, with parts broken away.
Figure 2:
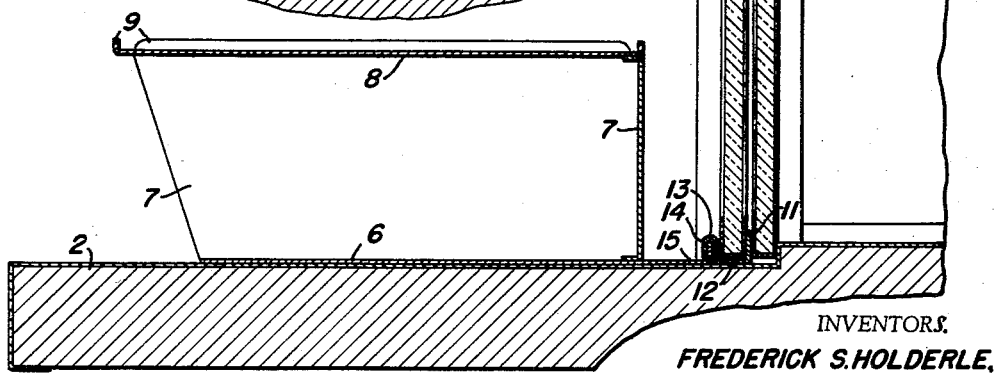
Fig. 2 is a vertical sectional view taken on line 2—2 of Fig. 1, looking in the direction indicated.

Referring more particularly to the drawings, in which like reference numerals refer to the same parts throughout the several views, 1 designates in general a display case for candies, cookies and the like, including a counter 2 between upright posts 3, and sliding doors 4 and 5 which are slidable over an opening to permit access to the interior of the case.

The goods are weighed and wrapped on counter 2 and it is desirable to provide a weighing scale support or platform that can easily be positioned and securely held on the counter 2, while permitting its removal when desired.

To accomplish this, there is provided a metal support or platform comprising a bottom wall 6, vertical walls 7 at its rear end and sides, and a top wall 8 terminating at its four edges in upstanding flanges 9, which act to retain and prevent accidental displacement of a weighing scale positioned on the top wall 8.

The scale support occupies an area between the rear edge of counter 2 and the doors 4 and 5, and is moved into operative position by a sliding motion into interlocking relation with suitable retaining means.

The sliding door 5 is guided in a fixed channel which includes rear wall 11, bottom wall 12 and front wall 13, and the front wall 13 is bent downwardly upon itself at its upper end to provide a curved flange 14 spaced from the wall 13, affording a guideway that receives a flange 15 projecting upwardly from the rear edge of the bottom wall 6 of the scale support. The bottom wall 6 extends rearwardly beyond the rear vertical wall 7, in order to space the scale support adequately from the sliding doors 4 and 5, and to permit detachably securing the support in operating position on the counter.

In order to position the scale support, it is first located with its bottom wall 6 on the counter 2 and its flange 15 to one side of and alined with the guideway formed between flange 14 and wall 13. Then by sliding the scale support endwise of the counter, the flange 15 becomes interlocked between flange 14 and wall 13. The scale support is then held against forward or backward movement, and can be removed when desired by movement endwise of the counter sufficiently to disengage the interlocking parts. In this manner the scale support or platform is securely held in fixed position on the counter against accidental displacement, and is conveniently located for efficient use.

While the invention has been described with reference to the particular embodiment shown, it is not confined to the details herein disclosed and this application is intended to cover such modifications or changes as may come within the purposes of the improvement or the scope of the following claims.

We claim:

1. In a display case including a counter, a weighing scale support positionable on said counter and including top and bottom walls and vertical rear and side walls, the bottom wall extending rearwardly beyond said vertical rear wall, a flange extending upwardly at a right angle from the rear edge of said bottom wall, a vertically arranged inverted U-shaped channel secured to the top surface of the counter and having interlocking engagement with said flange, the outer wall of said channel terminating above the counter and the scale support being slideable on the counter endwise of said inverted U-shaped channel for engagement and disengagement therewith, and said inverted U-shaped channel acting to prevent upward movement of the scale support when engaged with said channel.

2. In a display case including a counter, a sliding door at the rear of said counter, a fixed channel in which said door slides, said channel including a front wall terminating in a downwardly extending spaced curved flange affording a guideway, a weighing scale support positionable on said counter and comprising top and bottom walls and vertical side and rear walls, the bottom wall extending rearwardly beyond said vertical rear wall, and an upstanding flange at the rear of said bottom wall detachably and interlockingly engageable with said guideway, the scale support being slidable endwise of said interlocking guideway for engagement and disengagement therewith.

References Cited in the file of this patent
UNITED STATES PATENTS

| | | |
|---|---|---|
| 1,423,845 | Foss | July 25, 1922 |
| 1,624,437 | Savio | Apr. 12, 1927 |
| 1,937,994 | Taylor | Dec. 5, 1933 |
| 2,415,604 | Nalley | Feb. 11, 1947 |

FOREIGN PATENTS

| | | |
|---|---|---|
| 647,890 | Germany | July 15, 1937 |